US008132691B2

(12) United States Patent
Black, Jr. et al.

(10) Patent No.: US 8,132,691 B2
(45) Date of Patent: Mar. 13, 2012

(54) VENDING MACHINE DISPENSING SYSTEM

(75) Inventors: Talbert James Black, Jr., Pelion, SC (US); Thomas Roger Meinardi, Aiken, SC (US); Edmund Scott Richardson, Simpsonville, SC (US); Terring M. Ware, Aiken, SC (US)

(73) Assignee: Crane Merchandising Systems, Inc., Bridgeton, MO (US)

(*) Notice: Subject to any disclaimer, the term of this patent is extended or adjusted under 35 U.S.C. 154(b) by 753 days.

(21) Appl. No.: 12/220,069

(22) Filed: Jul. 21, 2008

(65) Prior Publication Data

US 2009/0037019 A1 Feb. 5, 2009

Related U.S. Application Data

(63) Continuation of application No. 10/678,154, filed on Oct. 6, 2003, now Pat. No. 7,401,710.

(60) Provisional application No. 60/415,761, filed on Oct. 4, 2002, provisional application No. 60/415,767, filed on Oct. 4, 2002, provisional application No. 60/415,773, filed on Oct. 4, 2002.

(51) Int. Cl.

| | |
|---|---|
| ***B65G 59/00*** | (2006.01) |
| ***B65H 3/44*** | (2006.01) |
| ***B65H 3/00*** | (2006.01) |
| ***G07F 11/00*** | (2006.01) |
| ***G05B 11/28*** | (2006.01) |

(52) U.S. Cl. .......... 221/131; 221/115; 221/92; 221/298; 221/6; 221/241; 221/124; 221/133; 221/289; 221/266; 221/258; 221/274; 318/599

(58) Field of Classification Search .................. 221/298, 221/6, 241, 131, 124, 133, 289, 266, 258, 221/274, 275, 115, 92; 318/599
See application file for complete search history.

(56) References Cited

U.S. PATENT DOCUMENTS

| | | | |
|---|---|---|---|
| 2,877,928 | A | 3/1959 | Patzer et al. |
| 3,128,013 | A | 4/1964 | Holstein et al. |
| 3,158,289 | A | 11/1964 | Van Brunt |
| 3,362,579 | A | 1/1968 | Newberry |
| 3,653,540 | A | 4/1972 | Offutt |
| 3,722,744 | A | 3/1973 | Payne |
| 3,732,875 | A | 5/1973 | Jensen et al. |
| 3,762,526 | A | 10/1973 | Kiefer |
| 3,810,560 | A | 5/1974 | Stegeman |

(Continued)

FOREIGN PATENT DOCUMENTS

JP 403189897 8/1991

(Continued)

*Primary Examiner* — Gene O. Crawford
*Assistant Examiner* — Rakesh Kumar

(57) ABSTRACT

A dispensing system for a vending machine includes a vend motor, a cradle, a load bar and a push arm. Upon selection of a particular product, the vend motor rotates the cradle, causing the product to emerge from the vending machine. The cradle is designed to accommodate a wide array of container sizes. The dispensing system incorporates a rotation sensor, a position sensor, and a lift arm. The sensors enable accurate rotation of the cradle through a plurality of vend angles depending upon the particular product being vended, while the lift arm cooperates with the push arm and load bar to refill the cradle after a series of product containers have been dispensed. In addition, the vend motor includes a soft start control that prevents instantaneous rotation of the output shaft so as to prolong an overall operational life of the motor.

20 Claims, 5 Drawing Sheets

U.S. PATENT DOCUMENTS

| | | | | | |
|---|---|---|---|---|---|
| 3,883,038 | A | * | 5/1975 | Bookout | 221/67 |
| 3,980,937 | A | | 9/1976 | Bostrom et al. | |
| 4,045,626 | A | | 8/1977 | Holper | |
| 4,104,552 | A | | 8/1978 | Tsergas | |
| 4,298,128 | A | | 11/1981 | Gattu | |
| 4,298,138 | A | | 11/1981 | Oden | |
| 4,331,259 | A | | 5/1982 | Imamura | |
| 4,454,961 | A | | 6/1984 | Childers et al. | |
| 4,509,658 | A | | 4/1985 | Oden | |
| 4,511,059 | A | | 4/1985 | Manzer | |
| 4,511,060 | A | * | 4/1985 | Lindsey | 221/115 |
| 4,512,454 | A | * | 4/1985 | Schuller et al. | 194/346 |
| 4,712,049 | A | | 12/1987 | Houserman | |
| 4,762,250 | A | | 8/1988 | Friberg | |
| 4,785,927 | A | * | 11/1988 | Dobbins | 194/200 |
| 4,834,689 | A | | 5/1989 | Levasseur | |
| 4,852,767 | A | * | 8/1989 | Humphrey | 221/241 |
| 4,900,909 | A | | 2/1990 | Nagashima et al. | |
| 4,940,161 | A | | 7/1990 | Hieb | |
| 4,991,740 | A | | 2/1991 | Levasseur | |
| 4,999,556 | A | | 3/1991 | Masters | |
| 5,027,023 | A | | 6/1991 | Koivikko | |
| 5,048,717 | A | | 9/1991 | Falk et al. | |
| 5,072,164 | A | | 12/1991 | Pruis et al. | |
| 5,172,605 | A | | 12/1992 | Schwartz | |
| 5,256,921 | A | | 10/1993 | Pruis et al. | |
| 5,259,530 | A | | 11/1993 | Ishine et al. | |
| 5,404,986 | A | * | 4/1995 | Hossfield et al. | 194/317 |
| 5,444,317 | A | | 8/1995 | Anderson et al. | |
| 5,446,326 | A | | 8/1995 | Scheider | |
| 5,555,965 | A | | 9/1996 | Mishina | |
| 5,651,476 | A | | 7/1997 | Percy et al. | |
| 5,799,823 | A | * | 9/1998 | Feltrin | 221/298 |
| 5,893,482 | A | | 4/1999 | Lang | |
| 5,893,487 | A | | 4/1999 | Little | |
| 5,924,595 | A | | 7/1999 | Crook | |
| 5,929,588 | A | | 7/1999 | Shiah | |
| 5,932,980 | A | | 8/1999 | Siraky | |
| 5,967,364 | A | * | 10/1999 | Swanson et al. | 221/6 |
| 5,977,732 | A | | 11/1999 | Matsumoto | |
| 6,008,597 | A | | 12/1999 | Pardo et al. | |
| 6,102,248 | A | | 8/2000 | Yamamiya | |
| 6,123,223 | A | | 9/2000 | Watkins | |
| 6,206,234 | B1 | | 3/2001 | Rawlins | |
| 6,211,794 | B1 | | 4/2001 | DeSoto | |
| 6,230,930 | B1 | | 5/2001 | Sorensen et al. | |
| 6,286,710 | B1 | | 9/2001 | Paek | |
| 6,302,293 | B1 | | 10/2001 | Wittern et al. | |
| 6,315,159 | B1 | | 11/2001 | Paczkowski | |
| 6,321,936 | B1 | | 11/2001 | Feltrin | |
| 6,328,180 | B1 | | 12/2001 | Sorensen et al. | |
| 6,330,856 | B1 | * | 12/2001 | Fitzgerald et al. | 100/52 |
| 6,390,328 | B1 | | 5/2002 | Obermeier et al. | |
| 6,435,169 | B1 | | 8/2002 | Vogt | |
| 6,502,718 | B2 | | 1/2003 | Fitzgerald et al. | |
| 6,561,380 | B1 | | 5/2003 | Suzuki | |
| 6,573,670 | B2 | | 6/2003 | Machalek et al. | |
| 6,758,370 | B2 | | 7/2004 | Cooke et al. | |
| 7,401,710 | B2 | * | 7/2008 | Black et al. | 221/131 |
| 2002/0104388 | A1 | | 8/2002 | Schrubbe | |
| 2002/0113078 | A1 | | 8/2002 | Kim et al. | |
| 2002/0180136 | A1 | * | 12/2002 | Amari et al. | 271/3.14 |

FOREIGN PATENT DOCUMENTS

| | | |
|---|---|---|
| JP | 6-187560 | 7/1994 |

* cited by examiner

VENDING MACHINE DISPENSING SYSTEM

CROSS-REFERENCE TO RELATED APPLICATIONS

This application is a continuation of prior U.S. patent application Ser. No. 10/678,154 filed on Oct. 6, 2003, which claims benefit of 60/415,761 filed on Oct. 4, 2002, and claims benefit of 60/415,767 filed on Oct. 4, 2002, and claims benefit of 60/415,773 filed on Oct. 4, 2002, which issued as U.S. Pat. No. 7,401,710 on Jul. 22, 2008.

BACKGROUND OF THE INVENTION

1. Field of the Invention

The present invention pertains to the art of vending machines and, more particularly, to a dispensing system for a vending machine.

2. Discussion of the Prior Art

Vending machines are commonly utilized in dispensing a wide range of products, including canned and bottled beverages, edible food items, and other consumer products. In the case of dispensing beverage products, it is desirable to configure a vending machine such that it is capable of dispensing various different sized and configured beverage containers. That is, as manufacturers of beverage products alter their container designs, it is desirable to not require the vending machine itself to be reconfigured, at least substantially, to accommodate a new product. Of course, the reliability of the overall dispensing system of the vending machine must be maintained.

For use in connection with dispensing canned and bottled beverage products, there is typically employed either a vend rotor or oscillator which is driven by a vend motor to sequentially dispense the beverage containers. In the case of the rotor, this arrangement generally takes the form of a cradle which initially receives one or more of the beverage products to be dispensed. Such cradles are typically semi-cylindrical in shape and mounted for rotation about a fore-to-aft extending axis under a column or stack of stored products. As the cradle rotates, the product(s) carried therein is dispensed. Typically, the cradle will be compartmentalized such that two or more fore-to-aft spaced products can be supported at any given time, with each product being sequentially dropped from the cradle as the cradle performs a complete 360° rotation, whereupon the cradle receives one or more additional products for dispensing. Known oscillator-type dispensing arrangements work on a generally similar principal, except that the corresponding product support or retention structure is driven to oscillate back and forth through a predetermined angle for dispensing sequential containers from a stack.

Therefore, in connection with these conventional can and bottle vending machines, motors are employed to establish the required rotation or oscillation which, in turn, functions to release stored products from within a storage rack. Whether the motor is coupled to a rotating (rotor) or oscillating (oscillator or bale) vending device, the overall system design must be configured to accommodate the particular product parameters. To this end, vendors typically employ a variety of shims, bottle rods, rod sleeves or the like to adjust the vending geometry as needed. Obviously, requiring these additional components to provide vending flexibility is undesirable, costly to manufacture, and increases overall assembly time.

In order to establish the desired rotation or oscillation, vending machines also utilize the various motors to move mechanisms in the form of cams and the like. In turn, the mechanisms release stored product from within a stack or storage rack arranged within the vending machine. In order to properly execute a vending operation each and every time a selection is made, motor shaft position must be controlled. In general, prior art vending machines typically use either AC or DC motors mounted to a plate within the vending machine. The motors are coupled to a cam and switch system which, in turn, controls the position of either the rotating or oscillating bail vending device. Furthermore, the vend motor must include an anti-pilferage mechanism as required to meet UL standards.

In operation, the cams and switches, when actuated by the motor, operate the rotating or oscillating bail device to dispense a product. Once the product vends, the cam interrupts power to the motor. Alternatively, the cam might interrupt power to a controller which, in turn, interrupts power to the motor. In any event, through a rather complicated arrangement of cams, switches and associated linkages, once a vending operation is complete, power to the motor is interrupted. In this manner, pilferage from the machine is limited.

Certainly these systems have proven themselves effective over the years, however, the overall complexity of the mechanisms has resulted in numerous failures. Cam mechanisms wear, switches fail, and bottles and cans jam in the stacks. Vending machines require constant maintenance in order to ensure the proper vending of product. Naturally, in order to remain profitable, the maintenance costs are passed on to the consumer through elevated prices of the vended product.

Still another concern is wear and tear on vend motor components. In typical fashion, upon receipt of an electrical signal, the vend motor activates instantaneously. That is, the output shaft moves from a state of rest to a dynamic state almost immediately. This abrupt change in state places a great deal of stress on gears, shafts and other components in the drive train. Over time, these stresses will cause a failure in the vending operation.

Based on the above, there exists a need in the art for an improved product delivery system for a vending machine which is designed to flexibly accommodate future package configurations, such as the length and/or diameter of various beverage containers, without requiring an undue number of components. In addition, there exists a need to more accurately control a vend motor by simplifying the overall cam and/or switch arrangement. Furthermore, there exists a need to operate a dispensing system in a manner so as to minimize stresses on motor components. In general, there exists a need to enhance the versatility and reliability of a vending machine dispensing assembly.

SUMMARY OF THE INVENTION

The present invention is directed to a dispensing system for a vending machine. In accordance with the most preferred form of the invention, the dispensing system includes a vend motor, a notched rotor, a push arm member, a return spring and a load bar. The vend motor is carried by a motor housing attached to support structure of the vending machine. An output of the vend motor is utilized to rotate an output cam member which, in turn, drives the notched rotor. The push arm member includes a first end portion rotatably mounted to a boss provided as part of the motor housing, while a second end portion of the push arm member is positioned along a peripheral portion of the output cam. In this fashion, as the cam rotates, the push arm member glides along the peripheral portion. The push arm is also connected to the load bar, retained by the return spring, and pivoted when engaged by a projection or lifting arm provided about a portion of the output cam.

With this arrangement, the vend motor functions to rotate the rotor to a series of controlled, dispensing positions. These positions actually correspond to spacing required in connection with properly dispensing a given product. In a hold position, the rotor is positioned to prevent pilferage. The notches provided as part of the rotor establish the vending geometry required for a wide variety of packages, without the need for additional components such as shims, bottle rods and the like. The rotor can actually be configured to any combination of notch length, depth and quantity to vend a variety of products. Therefore, a single rotor configuration will accommodate an abundance of present and future package designs. A corresponding arrangement can be established employing an oscillator.

In accordance with one embodiment of the present invention, the vend motor includes a main body housing, a DC motor, a plurality of sensors, an electronic controller, e.g., a I/O control board, and an actuating member. Each motor assembly is mounted to internal structure of the vending machine below an associated bottle stack. In the preferred form of the invention, each respective motor assembly is interconnected to a main, programmable controller which functions to operate a particular vend motor based on a consumer selection.

Specifically, a 24-volt DC motor having an input shaft and an output shaft is mounted to a top portion of the main body housing. More specifically, the output shaft is connected to a rotator or oscillator device through a gear system contained in the main body housing. Preferably, an input shaft rotation sensor is secured to the motor assembly and positioned to measure the angular rotation of the input shaft. In addition to the rotation sensor, a position sensor is mounted to the motor housing and positioned to measure the angular position of the output shaft. Preferably, the rotation and position sensors constitute magnetic sensor devices. However, other sensors, e.g., optical, hall-effect, detent and the like, are acceptable. Preferably, the position sensor is accurate to within ⅓° of rotation.

In accordance with the present invention, each of the rotation and position sensors interconnect with the electronic controller mounted to the motor housing. In this manner, a main controller can operate the vend motor to efficiently accomplish a desired vending operation. By mounting the sensors and motor to a housing having a profile which fits within the profile of the DC motor, a compact vending motor package is created which improves product delivery efficiency. With this overall arrangement, the combination of the input and output sensors and the electronic controller allow for very accurate, programmed motor position control preferably to within ⅓° of shaft rotation. In this preferred form of the invention, the sensors and controller eliminate the need for position sensing cams and switches and simplify the overall wiring of the machine. Additionally, through simple programming of the main controller, the rotator or oscillator vend position can be adjusted so as to eliminate the need for shims, bottle rods, and bottle rod sleeves.

In further accordance with the present invention, use of the 24-volt DC motor enables bi-directional movement of the rotator or oscillator device. With this arrangement, by simply controlling the polarity of power supplied to the motor, forward and reverse operation of the output shaft is possible. Accordingly, once the vending operation is complete, the motor output shaft can be reversed or backed-up to a "hold" position which prevents pilferage from the machine. In this manner, the DC vend motor of the present invention meets the requirements established by Underwriter's Laboratories.

In accordance with another aspect of the present invention, the dispensing system includes a soft start control. The soft start control utilizes a memory module in which is stored a software program for generating a start signal for the vend motor. The software program creates a dynamic pulse width modulated (PWM) signal for starting the motor. Preferably, the program's PWM signal starts with a low pulse width ratio that doubles with each successive pulse until a 100% duty cycle is achieved. In this manner, current is gradually applied to the motor such that the transition from a state of rest to a dynamic state is buffered. With this arrangement, the gears, shafts and other drive components will realize extended operational life.

The PWM signal of the present invention can easily be varied through manipulation of the software code such that a wide range of frequencies can be achieved. In this fashion, a particular PWM train can be implemented for each motor type, or design requirement. Further in accordance with the present invention, the soft start control is designed to be a "start and forget" system. Accordingly, once a 100% duty cycle is achieved, the software program terminates. In this manner, additional monitoring and termination of the signal is no longer required.

Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENT

Figure 1:
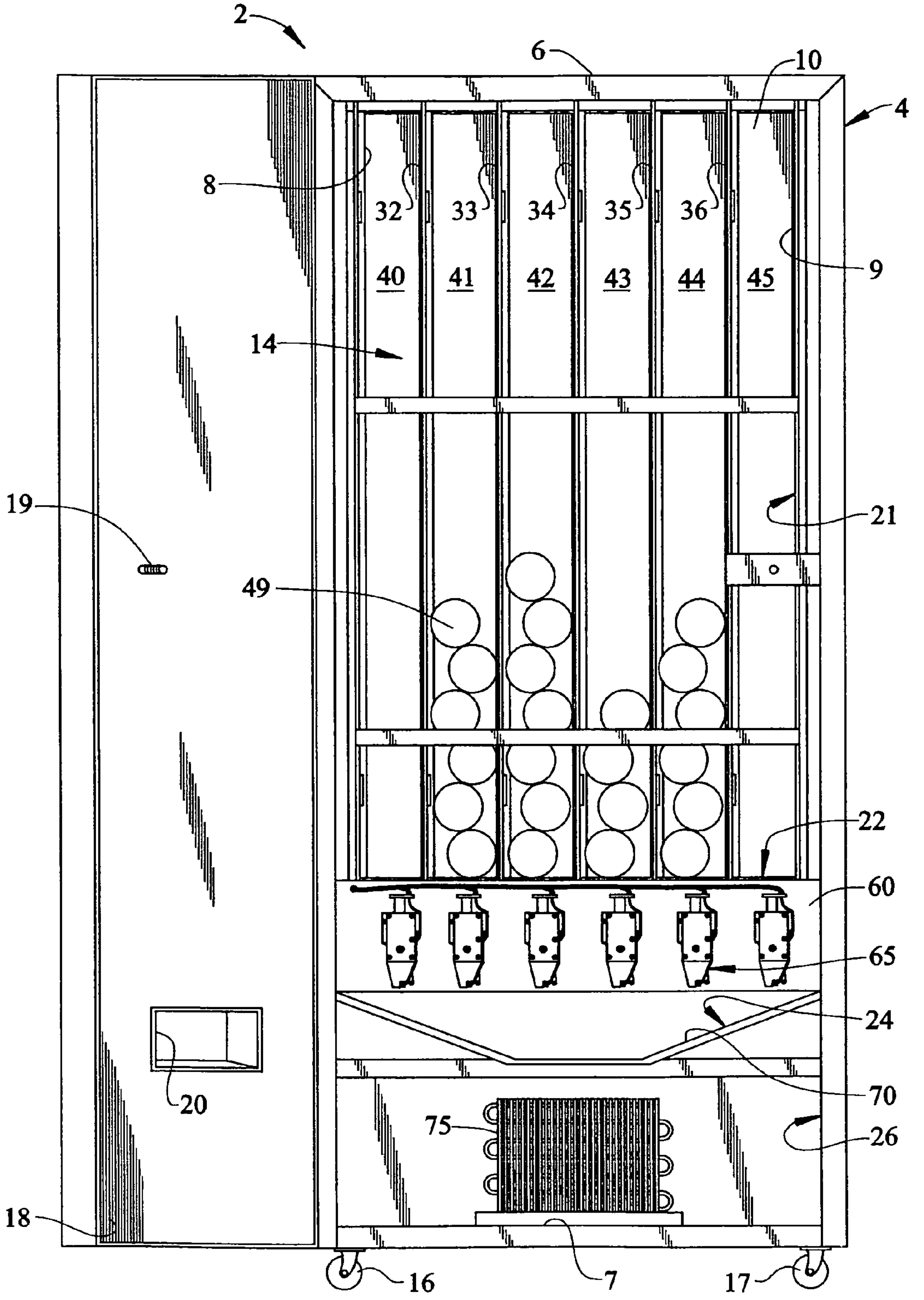
FIG. 1 is a plan view of a vending machine, shown having a main door in an open position exposing internal structure of the machine to illustrate interior vending zones, incorporating the vending machine dispensing system of the invention.

With initial reference to FIG. 1, a vending machine 2 includes a cabinet frame 4 having top, bottom, side and rear walls 6-10 that collectively define a central cavity 14. In a manner known in the art, a first pair of wheels or casters 16 and 17 are secured to a front edge portion of bottom wall 7 to facilitate the positioning of vending machine 2. Of course it should be realized that a second pair of wheels (not shown) are also arranged on a rear portion of bottom wall 7. A door 18 is pivotally mounted to cabinet frame 4 to selectively enable access to central cavity 14 in order to load various product containers or other commodities into vending machine 2. Door 18 is provided with a locking mechanism, shown in the form of a threaded rod 19, to retain door 18 in a closed position so as to prevent pilfering of the commodities from central cavity 14. Door 18 is also provided with an opening 20 to enable a consumer to remove a vended product container or other commodity from vending machine 2.

Central cavity 14 includes a storage section 21, a dispensing section 22, a delivery section 24 and a lower section 26. Storage section 21 is provided to hold products in escrow until a vending operation is performed. Towards that end, storage section 21 is provided with a plurality of vertically extending column walls 32-36 which, together with side walls 8 and 9, form a plurality of column or stack areas 40-45. In the embodiment shown in FIG. 1, stack areas 40-45 constitute single stack columns. However, it should be understood that the present invention also encompasses vending machines having multi-stack columns. In any event, stack areas 40-45 are partitioned by walls 32-36 to contain, separate and support a plurality of generally cylindrical containers 49 which, in the embodiment shown, constitute soda cans.

As further shown in FIG. 1, dispensing section 22 is provided with a frontal support wall 60 having arranged thereon a plurality of vend motor units, one of which is indicated at 65. As will be discussed more fully below, a plurality of cradles (not shown), that support and deliver product container 49 to a consumer, are arranged behind frontal support wall 60. Actually, each column or stack area 40-45 is provided with an associated cradle (not shown) that is operated through a respective one of the plurality of vend motor unit 65. Upon selection of a particular product container 49 or other commodity, one of the plurality of vend motor unit 65 is activated to rotate a respective cradle causing a product container 49, corresponding to the selected product to emerge from vending machine 2. That is, product container 49 is transported to a product delivery chute 70 provided in delivery section 24 which is exposed to opening 20 in door 18. In order to maintain containers 49 in a refrigerated state, lower section 26 is provided with a cooling system 75. In general, the above description is provided for the sake of completeness and to enable a better understanding of the invention. The present invention is particularly directed to a vending system for delivering a product from stack areas 40-45 to product delivery chute 70.

Referring to FIGS. 2-5, a vending system constructed in accordance with a preferred embodiment of the invention is indicated generally at 100. As each stack area 40-45 includes a distinct vending system 100, the vending system 100 for column area 44 will be described in detail and it is to be understood that each of stack areas 40-43 and 45 has a corresponding vending system 100. As shown, vending system 100 includes vend motor unit 65, a notched cradle 106, a load bar 108, a push arm 110 and a return spring 112. Cradle 106 and load bar 108 extend fore-to-aft in a bottom portion of column area 44. In accordance with a preferred form of the invention, vend motor unit 65, push arm 110 and return spring 112 are actually mounted on an outside surface of frontal support wall 60 and, as will be discussed more fully below, are operatively connected to cradle 106 and load bar 108.

In accordance with the depicted embodiment of the present invention, the overall vend motor unit 65 includes a motor housing 120 that supports a motor 122. Preferably, motor 122 is a 24-volt DC electric motor having an output shaft 124 interconnected to a vend motor unit output shaft 125 through a gear mechanism (not shown). More specifically, vend motor unit output shaft 125 includes a first hub portion 128 having a cam surface 130 provided with a lifting arm 131. Vend motor unit output shaft 125 also includes a second hub portion 134 that projects from first hub portion 128. When mounted to frontal support wall 60, second hub portion 134 projects through an opening 136 having a bushing 137. Bushing 137 limits the wear on hub 134 as motor 122 rotates vend motor unit output shaft 125 through various vend positions. As shown, second hub portion 134 includes a plurality of lands and grooves (not separately labeled) which, as will be discussed more fully below, operatively engage with cradle 106 through opening 136.

Figure 5:
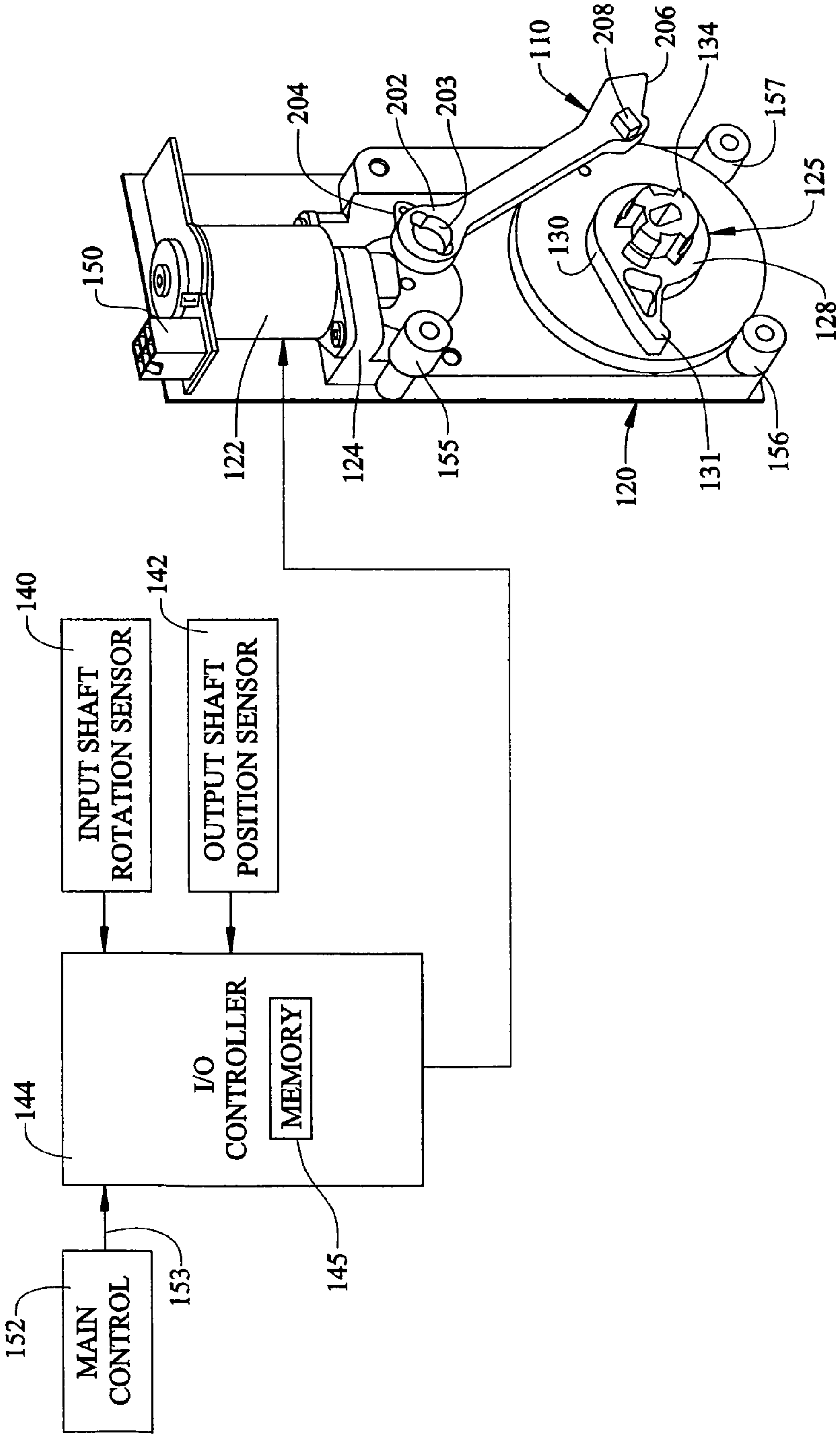
FIG. 5 is a perspective view of a vend motor assembly depicting rotation and position sensors arranged in accordance with the present invention, along with a block diagram depicting a soft start system employed in connection with the present invention.

As best shown in FIG. 5, vending system 100 includes a motor shaft rotation sensor 140 and a motor shaft position sensor 142, each of which is electrically connected to an I/O controller 144. Preferably, I/O controller 144 includes a memory module 145 for storing particular positions of output shaft 124 and vend motor unit output shaft 125. Rotation sensor 140 and position sensor 144 can be of various types, such as Hall effect sensors, magnetic sensors as well as other non-mechanical sensors, that provide very accurate inputs to I/O controller 144. With this particular arrangement, the position of vend motor unit output shaft 125 can be controlled in a very precise manner. That is, I/O controller 144 can determine, within approximately ⅓ of a degree of rotation, a particular position of vend motor unit output shaft 125. Motor housing 120 is also provided with a terminal block element 150 which electrically interconnects vend motor unit 65 with a main vend control 152 through a wire harness 153. As also illustrated in FIG. 5, a plurality of spacers 155-157 are arranged about motor housing 120. As will be discussed more fully below, spacers 155 and 157 orient vend motor unit 65 with respect to frontal support wall 60, as well as the remainder of the components of vending system 100.

Figure 2:
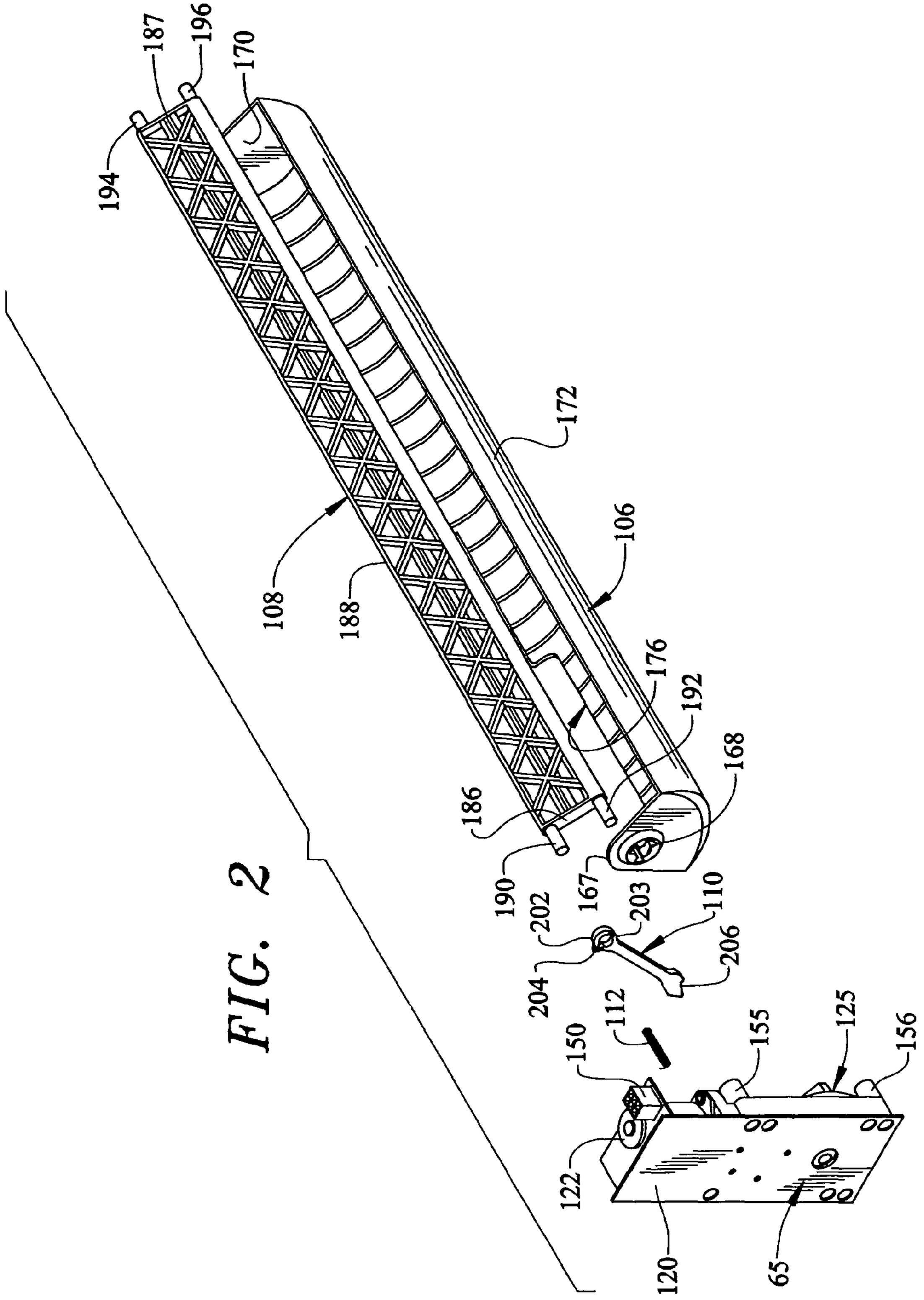
FIG. 2 is an exploded view of the dispensing system of the invention.
Figure 3:
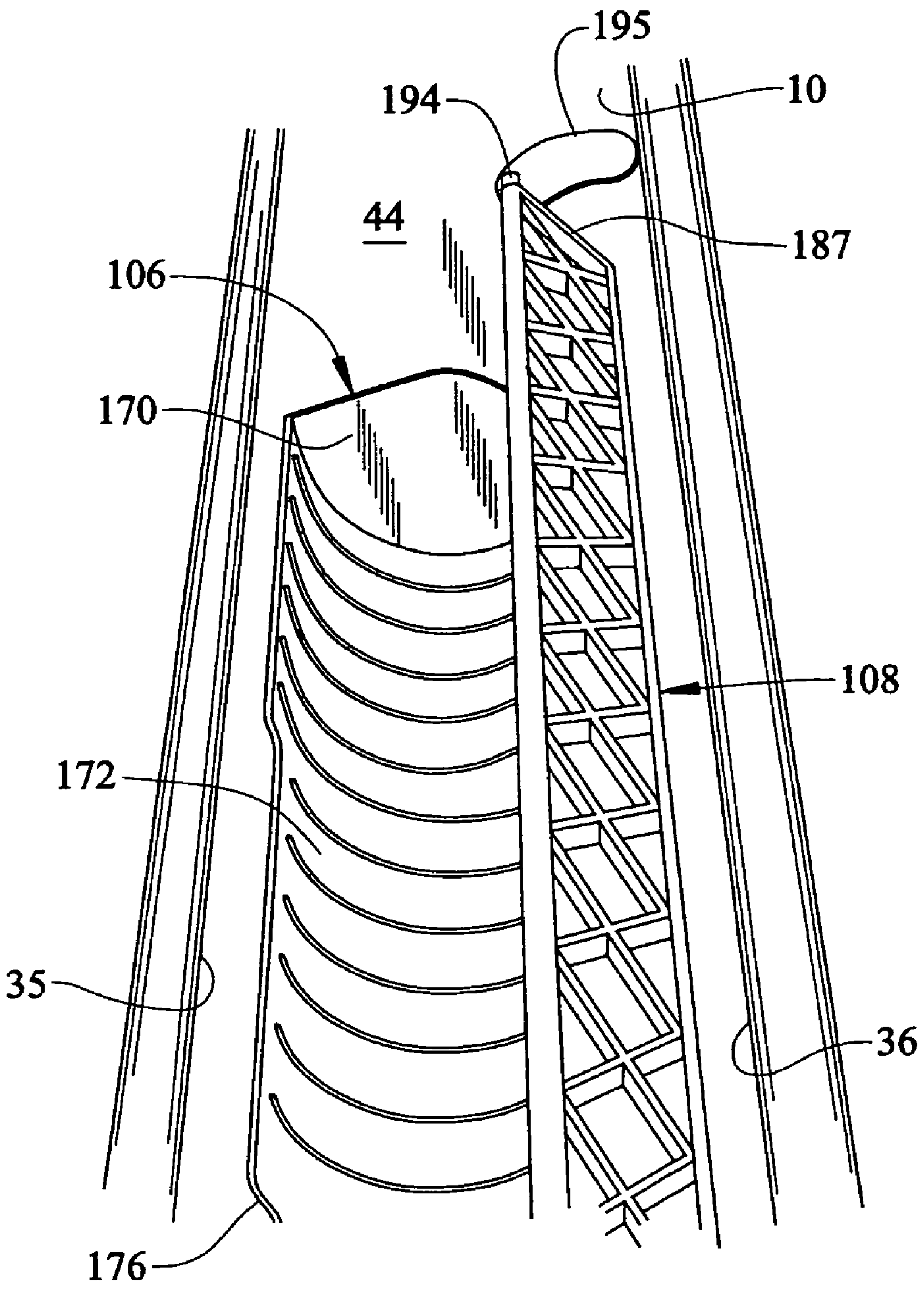
FIG. 3 is an upper perspective view into the vending machine of FIG. 1, further showing the dispensing system of the invention.
Figure 4:
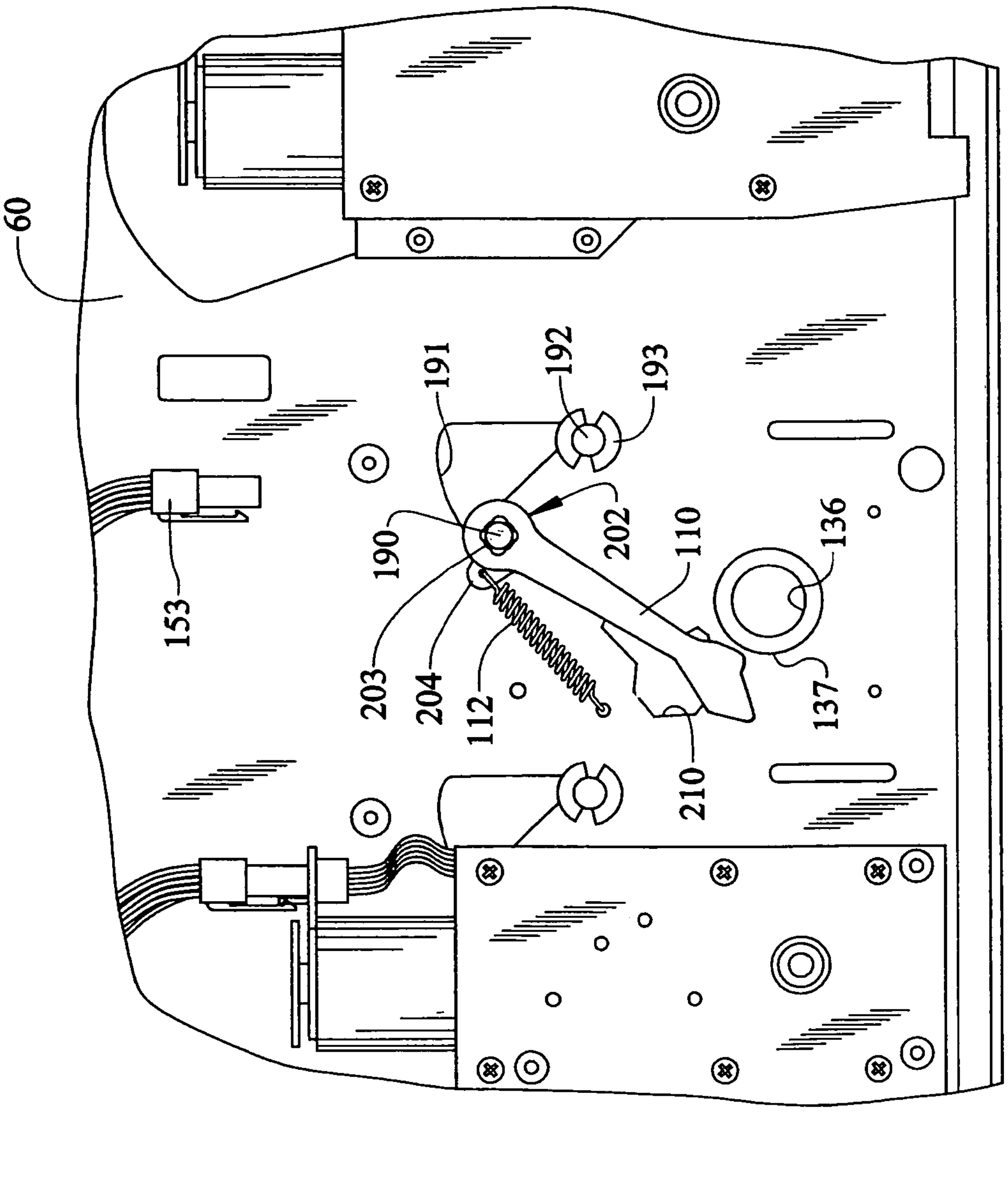
FIG. 4 is a partial, front plan view of the vending machine of FIG. 1, with one vend motor removed to illustrate a push arm arrangement constructed in accordance with the present invention.

Referring to FIG. 2, cradle 106 includes a first end 167 provided with a hub portion 168 having a plurality of lands and grooves (not separately labeled) that are adapted to engage with second hub portion 134 of vend motor unit 65. First end 167 leads to a second end 170 through an intermediate portion 172. Preferably, intermediate portion 172 includes a plurality of terraced notches or grooves, one of which is indicated at 176. Cradle 106 is adapted to support a plurality of containers at a position adjacent to each of the plurality of notches 176. During a vend operation when cradle 106 is rotated through various vend angles, a product(s) resting in intermediate portion 172 will be sequentially dispensed from vending machine 2. The particular programming of the vend angles into controller 140 does not form part of the present invention and is actually set forth in greater detail in a U.S. patent application entitled "Microprocessor Programmable and Selectable Vending Options and Control" which is filed on even date herewith and incorporated herein by reference.

As further illustrated in FIG. 2, load bar 108 includes a first end 186, a second end 187, and an intermediate portion 188. More specifically, first end 186 is provided with a forward guide member 190 adapted to extend through an opening 191 in frontal support wall 60 (see FIG. 4). Also arranged on first end 186 is a pivot member 192 which is supported for rotation in a bushing 193 on frontal support wall 60. In a similar manner, second end 187 is provided with a rear guide member 194 adapted to travel in a rear guide track 195 (also see FIG. 3) arranged in rear wall 10. Adjacent to rear guide member 194 is a rear pivot member 196 which is rotatably supported by rear wall 10 and axially aligned with forward pivot member 192 to define an axis of rotation for load bar 108.

During select portions of a vend operation, load bar 108 is moved between a first position wherein intermediate portion 188 supports a column of product containers, to a second position enabling a lowermost container(s) to be carried into cradle 106. Toward that end, push arm 110 is provided with a first end 202 having a hub 203 adapted to matingly engage with guide member 190 of load bar 108. First end 202 of push arm 110 is also provided with an ear element 204 having a central opening (not separately labeled) for connecting with return spring 112. First end 202 leads to a second end 206 adapted to ride along cam surface 130 of first hub portion 128 during the vend operation. In addition, second end 206 is provided with a guide element 208 adapted to travel in a guide opening 210 located in frontal support wall 60. With this construction, rotation of vend motor unit output shaft 125 will cause lifting arm 131 to engage with second end 206 of push arm 110. Lifting arm 131 causes push arm 110 to translate upward, moving load bar 108 from a first or support position to a second or loading position, thus enabling product containers 49 to fall into cradle 106. As lifting arm 131 continues to translate upward, guide element 208 travels within guide opening 210, whereupon push arm 110 will eventually return to an initial set position under the force of return spring 112.

The manner in which vending system 100 carries out a vend operation will now be described. In a manner known in the art, to initiate the vend operation, a consumer inserts currency into a designated opening provided on vending machine 2. At this point, the consumer selects one of a plurality of products through various control elements (not shown) generally arranged on an outer surface of door 18. After product selection, main control 152 signals the I/O controller 144 to activate a vend motor unit 65 corresponding to a particular stack area 40-45 in which the selected product is located. Actuation of vend motor unit 65 causes vend motor unit output shaft 125 to begin to rotate cradle 106 to a particular vend angle. Following each vend operation, controller 144 stores an angle value or position corresponding to a previously vended product. I/O controller 144 will rotate cradle 106 a predetermined amount in order to cause the selected product container to fall passed the associated one of the plurality of grooves 176 into product delivery chute 70. After a predetermined number of vending operations, generally corresponding to the storage capacity of cradle 106, lift arm 131 causes push arm 110 to travel within opening 191, causing load bar 108 to deflect or move to its second position in order to allow additional product containers 49 to be replenished or reloaded in cradle 106. During the entire operation, I/O controller 144 senses, through inputs received from rotation sensor 140 and position sensor 142, the rotational angle of cradle 106.

In accordance with the most preferred form of the present invention, I/O controller 144 supplies motor 122 with a pulse width modulated (PWM) signal to control a speed at which vend motor unit output shaft 125 rotates. I/O controller 144 includes a program, stored in memory 145, for generating a particular start signal for vend motor unit 65. That is, a ramped PWM signal is sent to motor 122 so as to gradually increase the rotational speed of vend motor unit 65. Preferably, the PWM signal starts with a low pulse width ratio that doubles with each successive pulse until a 100% duty-cycle is attained. In this manner, electrical current is gradually applied to motor 122 such that a transition from a state of rest to a dynamic state is buffered. The PWM signal of the present invention can be easily varied, such as through a manipulation of software code, such that a wide range of frequencies can be achieved. In this manner, a particular PWM train can be developed for each application. In further accordance with the present invention, the soft start control is designed to be a "start and forget" system. That is, once initiated, additional monitoring is not required. With this construction, rapid starts and stops that typically wear motor components are eliminated. In further accordance with the most preferred form of the invention, I/O controller 144, rotation sensor 140 and position sensor 142 are all carried by motor housing 120 and arranged in a manner to maintain a thin profile for vend motor unit 65.

In any event, it should be recognized that the vending system of the present invention provides an accurate product dispensing control, preferably to within approximately ⅓° of rotation, thereby eliminating the need for mechanical position sensing components. Moreover, by incorporating the controller and various sensors into vend motor unit 65, the overall wiring of vending machine 2 is simplified. The vending system also eliminates the need for shims or bottle rods to adjust for various product container sizes. Furthermore, vend motor unit 65 prevents pilfering from vending machine 2 as required by U.L. standards.

Although described with reference to a preferred embodiment of the present invention, it should be readily apparent to one of ordinary skill in the art that various changes and/or modifications can be made to the invention without departing from the spirit thereof. For instance, it should be recognized that the cradle could be in the form of an oscillator or rotor and that various cradles could be used to accommodate different product container sizes. Also, it should be noted that the vend motor can be made operable in both forward and reverse rotational directions. Most preferably, after a vend operation, the vend motor is partially reversed so as to prevent unauthorized removal or pilfering of product containers from the vending machine. In any event, the invention is only intended to be limited to the scope of the following claims.

We claim:

1. A dispensing system for use in a vending machine, the dispensing system comprising:

a vend motor assembly adapted to be regulated by a controller to operate a vend motor in a vend operation and to reverse the vend motor after completion of the vend operation, the vend motor assembly including a cam member connected to a motor shaft of the vend motor, a rotation sensor operatively connected to the controller, and a position sensor operatively connected to the controller, the controller configured to operate the vend motor through a pulse width modulated signal to provide a soft start in which a speed of the motor shaft is gradually increased upon activation of the vend motor;

a cradle member adapted to be rotated by the vend motor, wherein rotation of the cradle member is regulated by the controller in response to signals received from the rotation sensor and the position sensor such that the cradle member is within a predetermined proximity to a desired vend angle during the vend operation;

a load bar mounted for a pivotal movement about the cradle member; and a push arm adapted to be shifted by the vend motor to selectively move the load bar between a product support position and a product release position.

2. The dispensing system of claim 1, wherein the controller is connected to a terminal block located within the vend motor assembly.

3. The dispensing system of claim 1, wherein the controller is configured to start the pulse width modulated signal with a low pulse width ratio and to substantially double the pulse width ratio during each successive pulse until a 100% duty cycle is achieved.

4. The dispensing system of claim 1, wherein the controller is operatively connected to a vending machine controller, the controller configured to be responsive to a signal received from the vending machine controller to engage the vend motor assembly to operate in the vend operation.

5. The dispensing system of claim 1, wherein the cradle comprises:

a first end operatively connected to the motor shaft of the vend motor;

a second end rotatably supported in a central cavity of the vending machine; and an intermediate portion.

6. The dispensing system of claim 5, wherein the intermediate portion includes at least one notch that establishes the vend angle for dispensing a product container during the vend operation.

7. The dispensing system of claim 6, wherein rotation of the cradle member is regulated by the controller such that the cradle member is rotated to within ⅓° of the desired vend angle during the vending operation.

8. An apparatus for use in a vending machine, the apparatus comprising:

a controller;

a vend motor adapted to be regulated by the controller, to operate in response to signals from the controller in a vend operation, and to reverse in response to signals from the controller after completion of the vend operation;

a motor shaft for the vend motor;

a cam member connected to the motor shaft;

a rotation sensor operatively connected to the controller;

a position sensor operatively connected to the controller; and a first connection adapted to operatively connect the motor shaft to a cradle member such that the cradle member is rotated by the motor shaft, wherein the controller regulates rotation of the cradle member in response to signals received from the rotation sensor and the position sensor to within a predetermined proximity to a desired vend angle during the vend operation, wherein the controller operates the vend motor through a pulse width modulated signal to provide a soft start in which a speed of the motor shaft is gradually increased upon activation of the vend motor.

9. The apparatus of claim 8, rotation of the cradle member is regulated by the controller such that the cradle member is rotated to within ⅓° of the desired vend angle during the vending operation.

10. The apparatus of claim 8, wherein the controller is configured to start the pulse width modulated signal with a low pulse width ratio and substantially double the pulse width ratio during each successive pulse until a 100% duty cycle is achieved.

11. The apparatus of claim 8, wherein the controller is operatively connected to a vending machine controller, the controller configured to be responsive to a signal received from the vending machine controller to engage the vend motor to operate in the vend operation.

12. The apparatus of claim 8, wherein the cradle comprises:

a first end operatively connected to the motor shaft of the vend motor via the first connection;

a second end rotatably supported in a central cavity of the vending machine; and an intermediate portion.

13. The apparatus of claim 12, wherein the intermediate portion includes at least one notch that establishes the vend angle for dispensing a product container during the vend operation.

14. The apparatus of claim 8, further comprising:

a load bar mounted for a pivotal movement about the cradle member; and a push arm adapted to be shifted by the vend motor to selectively move the load bar between a product support position and a product release position.

15. A method for dispensing products in a vending machine, the method comprising:

receiving a signal indicating a request to vend a selected product;

activating a vend motor assembly to perform a vend operation;

sensing a degree of rotation of a first rotating member of the vend motor assembly;

sensing a position of a second rotating member of the vend motor assembly;

rotating a cradle member, by the vend motor assembly, within a predetermined proximity to a desired vend angle during the vend operation to cause the selected product to be vended;

storing an angle value corresponding to the vended product; and operating the vend motor assembly in reverse after completion of the vend operation.

16. The method of claim 15, further comprising rotating the cradle member to within ⅓° of the desired vend angle during the vending operation.

17. The method of claim 15, further comprising determining a vend angle position of the cradle member based on the sensed degree of rotation and sensed position.

18. The method of claim 15, further comprising controlling a start of the vend motor assembly through pulse width modulated signal to provide a soft start wherein a speed of a vend motor assembly motor shaft is gradually increased upon activation of the vend motor assembly.

19. The method of claim 15, further comprising rotating a load bar from a support position for supporting a plurality of products to a load position for placing at least one of the plurality of products in a position to be vended.

20. The method of claim 18, further comprising:

initiating the pulse width modulated signal with a low pulse width ratio; and substantially doubling the pulse width ratio during each successive pulse until a 100% duty cycle is achieved.

* * * * *